United States Patent [19]

Morton et al.

[11] E Re. 30,687

[45] Reissued Jul. 21, 1981

[54] ENERGY SAVING DEVICE FOR A STANDARD FLUORESCENT LAMP SYSTEM

[75] Inventors: Edward W. Morton, Bronx, N.Y.; John F. Gilmore, Verona, N.J.

[73] Assignee: Westinghouse Electric Corp., Pittsburgh, Pa.

[21] Appl. No.: 100,314

[22] Filed: Dec. 4, 1979

Related U.S. Patent Documents

Reissue of:

[64] Patent No.: 4,082,981
Issued: Apr. 4, 1978
Appl. No.: 772,790
Filed: Feb. 28, 1977

[51] Int. Cl.[3] ..... H05B 41/36; H01J 17/34

[52] U.S. Cl. ..... 315/58; 315/73; 315/97; 315/106; 315/187; 315/240; 315/309

[58] Field of Search ..... 315/53, 58, 73, 74, 315/97, 106, 187, 189, 228, 240, 309, DIG. 5

[56] References Cited

U.S. PATENT DOCUMENTS 3,921,032 11/1975 Hallay ..... 315/106
3,954,316 5/1976 Luchetta ..... 315/96
3,956,665 5/1976 Westphal ..... 315/95

*Primary Examiner*—Eugene R. La Roche
*Attorney, Agent, or Firm*—R. S. Lombard

[57] ABSTRACT

There is provided in combination with a rapid-start series-sequence type ballast for two low-pressure mercury discharge lamps, apparatus for reducing the power consumption of both lamps. The apparatus utilizes switch means in conjunction with a capacitor to limit the current supply to the lamps after the lamps are energized. The switch means has two members in series circuit arrangement with one of the electrodes of one of the lamps. Each member is connected on opposite sides of the electrode. The capacitor is connected in parallel circuit arrangement with one of the members. Initially upon energization the switch means has a low impedance state to permit current flow and then switches to a high impedance state. The switch means permits preheating of the electrode and thereafter upon response to current flow switches and causes the lamp current to pass through the capacitor and thereby decrease by a predetermined amount the current through the normally operating lamps. The switch means may comprise switch members having a positive temperature coefficient of electrical resistance.

9 Claims, 3 Drawing Figures

ENERGY SAVING DEVICE FOR A STANDARD FLUORESCENT LAMP SYSTEM

Matter enclosed in heavy brackets [ ] appears in the original patent but forms no part of this reissue specification; matter printed in italics indicates the additions made by reissue.

BACKGROUND OF THE INVENTION

This invention relates to an energy saving device for a two-lamp rapid-start series-sequence fluorescent lamp system.

In recent years there have been a number of devices disclosed for reducing the power consumed by existing fluorescent lamp systems. In U.S. Pat. No. 3,954,316, dated May 4, 1976, issued to J. F. Leuchetta, is described an attachment for inclusion in a two-lamp rapid-start type fluorescent lamp. It comprises an isolation transformer and a capacitor to reduce the electrical power consumption of the lamp. The capacitor is placed in series with the existing power factor correcting capacitor in the standard ballast and thereby reduces current after energization. The isolation transformer provides heater current for one of the electrodes of one of the lamps and also functions to improve the power factor.

In U.S. Pat. No. 3,956,665, dated May 11, 1976, issued to J. A. Westphal, is disclosed an energy saving device for replacing a fluorescent lamp in a two-lamp serially connected fluorescent fixture. Frequently, in order to save energy, every other set of two fluorescent lamps are disconnected with their ballasts remaining in the circuit. The unloaded ballasts have an undesirable inductive power factor. The Westphal device permits the use of one of the two lamps by placing a capacitor in series with the lamp, thereby providing somewhat improved light distribution and power factor.

The present invention is an improvement over the prior art in that it is relatively inexpensive, readily adaptable to existing fluorescent lamp systems, and provides good light distribution and power factor.

SUMMARY OF THE INVENTION

The present power reducing means operates in combination with a rapid-start type ballast for two low-pressure mercury-discharge fluorescent lamps, which ballast includes an autotransformer adapted to be connected across an AC energizing source. The lamps are connected in series circuit relationship with ballasting capacitor means with the series combination connected across the primary and secondary of the autotransformer. The lamps each have two contacts at each end thereof connecting to two electrodes operatively positioned proximate the ends of the lamps. Additional heater windings are provided in transformer relationship with the primary of the autotransformer and connect to each of the contacts of the lamps to preheat the lamp electrodes upon energization of the ballast. A starting capacitor is connected in parallel with one of the lamps to facilitate series-sequence starting of the lamps. The foregoing construction is generally conventional.

In accordance with the present invention, there is provided a power reducing means included in series relationship with the two contacts at one end of the lamps. The power reducing means comprises a switch means which initially upon energization has a low impedance state to permit current flow and then switches to a high impedance state. The switch means comprises a first switch member in series with one of the contacts at one end of the one lamp. A second switch member is connected in series circuit arrangement with the other of the contacts at the one end of the one lamp. A current limiting capacitor means of predetermined capacitance is connected in parallel circuit arrangement across one of said switch members. When the circuit is initially energized, the switch means permits preheating of the lamp electrodes connecting to the contacts at the one end of the one lamp. After the lamp electrode is preheated and upon response to current flow, the switch means switches and causes the lamp current to pass through the current limiting capacitor means and decrease by a predetermined amount the current through the normally operating lamps.

BRIEF DESCRIPTION OF THE DRAWINGS

For a better understanding of the invention, reference may be had to the preferred embodiments, exemplary of the invention, shown in the accompanying drawings, in which.

DESCRIPTION OF THE PREFERRED EMBODIMENTS

Figure 1:
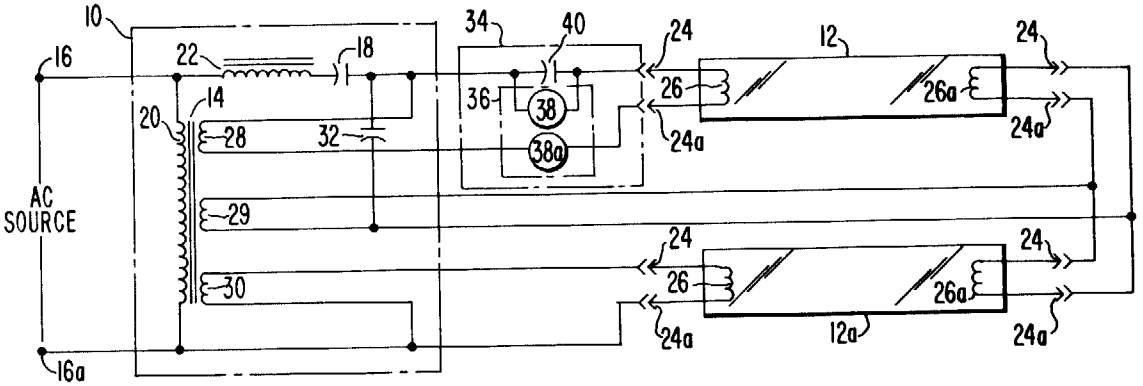
FIG. 1 is a schematic diagram, showing a rapid-start series-sequence fluorescent lamp ballast with two fluorescent lamps incorporating the power reducing means, in accordance with the present invention.

FIG. 1 is shown a rapid-start type ballast 10 for two low-pressure mercury-discharge fluorescent lamps 12, 12a. An autotransformer 14 is adapted to be connected across the AC energizing source terminals 16, 16a. The lamps 12, 12a are connected in series circuit relationship with a ballasting capacitor means 18. The series combination is connected across the primary 20 and secondary 22 of the autotransformer 14. The lamps 12, 12a each have two contacts 24, 24a at each end thereof connecting two electrodes 26, 26a, operatively positioned proximate the ends of the lamps 12, 12a. Additional heater windings 28, 29, 30, in transformer relationship with the primary 20 of the autotransformer 14 connect to each of the lamp contacts 24, 24a to preheat the lamp electrodes 26, 26a upon energization of the ballast 10. Starting capacitor 32 is connected in parallel with one of the lamps 12 to facilitate the series-sequence starting of the lamps. The circuit as described hereinbefore is generally conventional.

In accordance with the present invention there is provided a power reducing means 34 included in series relationship with the two contacts 24, 24a at one end of one of the lamps 12. The power reducing means 34 comprises a switch means 36 which initially upon energization has a low impedance state to permit current flow and then switches to a high impedance state. Switch means 36 comprises a first switch member 38 in series with one of the contacts 24 of one end of the one lamp 12. The second switch member 38a is connected in series with the other of the contacts 24a at the one end of the one lamp 12. A current limiting capacitor means 40 of predetermined capacitance is connected in parallel circuit arrangement across one of the switch members 38. When the circuit is initially energized, the switch means 36 permits preheating of the lamp electrode 26 connecting to the contacts 24, 24a at the one end of the one lamp 12. Thereafter, upon response to current flow, the switch means 36 switches and causes the lamp current to pass through the current limiting capacitor means 40 and decrease by a predetermined amount the current through the normally operating lamps 12, 12a.

Switch means 36 preferably comprises switch members 38, 38a having a positive temperature coefficient of electrical resistance. When the lamps are initially energized these PTC resistor switch members have a low resistance and the current limiting capacitor means is effectively out of the circuit. After a predetermined time the switch members have a markedly increased resistance because of resistance heating and the current limiting capacitor means 40 is effectively in the circuit. The switch members may alternatively be composed of bimetal switches or solenoid actuated type switches. Table I, below, gives typical values for use in the power reducing means shown in FIG. 1.

TABLE I

| Reference Identification | |
|---|---|
| 38, 38a | PTC resistor $\approx 15\ \Omega < 25°$ C. $\approx 20{,}000\ \Omega \geqq 60°$ C. |
| 40 | Capacitor, $5\mu F \pm 10\%$, 200 VDC |

Figure 2:
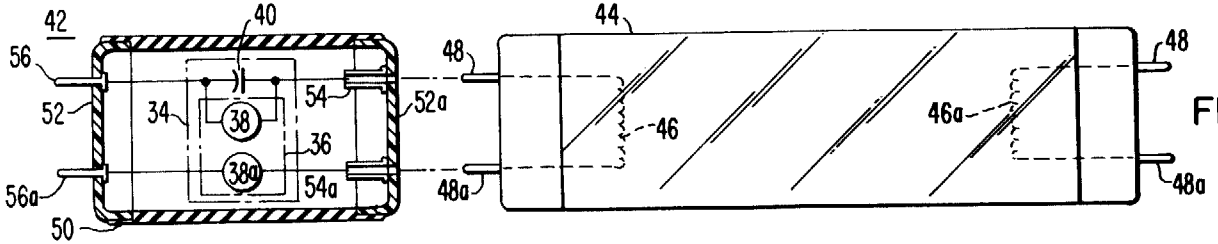
FIG. 2 is a cross-sectional view shown schematically, showing the power reducing means in an adaptor-container.

In another embodiment, in FIG. 2 is shown an adaptor-container 42 made of an insulating material such as a molded phenolic resin, for connection to one fluorescent lamp 44 of a two fluorescent lamp rapid-start series-sequence installation. The one fluorescent lamp 44 has electrodes 46, 46a operatively positioned proximate the ends thereof. Each of the electrodes 46, 46a is connected at its ends to two pin contacts 48, 48a positioned at each end of the one lamp 44. Adaptor-container 42 comprises an outer protective jacket 50 having end members 52, 52a disposed at either end thereof. One of the end members 52a has two receptacle contacts 54, 54a operatively positioned so as to receive the two pin contacts 48, 48a disposed at one end of the one fluorescent lamp 44. The other of the end members 52 has two pin members 56, 56a operatively positioned and readily adaptable to fit into a standard rapid fluorescent lamp fixture. A power reducing means 34 included within the adaptor-container 42 comprises switch means 36 which initially upon energization has a low impedance state to permit current flow and then switches to a high impedance state. The switch means comprises a first switch member 38 connected in circuit between one of the receptable contacts 54 and one of the pin members 56. The second switch member 38a is connected in circuit between the other of the receptacle contacts 54a and the other of the pin members 56a. A current limiting capacitance means 40 is connected in parallel circuit arrangement across one of the switch members 38, 38a. When the lamp 44 initially is energized, the switch means 36 permits preheating of the one electrode 46. Thereafter, upon response to current flow, the switch means 36 switches and causes the lamp current to pass through current limiting capacitor means 40, and decrease by a predetermined amount the current through the normally operating lamp. In the usual case, the lamp 44 will be shortened to accommodate the power reducing device 42 in the standard fixture.

Figure 3:
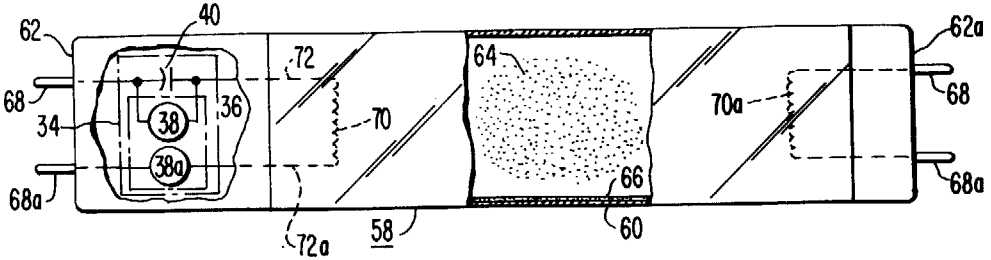
FIG. 3 is a cross-sectional view, partly broken away, shown schematically, showing a low-pressure mercury-discharge lamp containing as an integral part thereof the power reducing means of the present invention.

In another embodiment, there is shown in FIG. 3 a fluorescent lamp 58 of the rapid-start type comprising an elongated envelope 60 having base members 62, 62a integrally connected at opposite ends of the lamp 58 and enclosing a gas-discharge sustaining filling 64. A phosphor coating 66 is carried on the interior surface of the envelope 60. The base members 62, 62a each have two electrical contacts 68, 68a attached thereto, and in circuit with electrodes 70, 70a operatively positioned proximate the ends of the lamp 58. The lamp as described is generally conventional.

In accordance with the present invention there is provided a power reducing means 34 included within one of the base members 62. Power reducing means 34 comprises switch means 36 which initially upon energization has a low impedance state to permit current flow and then switches to a high impedance state. The switch means 36 comprises a first switch member 38 in series with one of the contacts in the one base member 62 and one end 72 of one of the electrodes 70. Second switch member 38a is in circuit with the other of the contacts 68a and the other end 72a of the one electrode 70. A current limiting capacitor means 40 is connected in parallel circuit arrangement across one of the switch members 38, 38a. When the lamp 58 initially is energized the switch means 36 permits preheating of the one electrode 70. Thereafter, upon response to current flow, the switch means 36 switches and causes the lamp current to pass through the current limiting capacitor means 40 and decrease by a predetermined amount the current through the normally operating lamp.

We claim:

1. In combination with a rapid-start type ballast for two low-pressure mercury-discharge fluorescent lamps comprising an autotransformer adapted to be connected across an AC energizing source, said lamps connected in series circuit relationship with ballasting capacitor means with the series combination connected across the primary and the secondary of said autotransformer, said lamps each having two contacts at each end thereof connecting to electrodes operatively positioned proximate the ends of said lamps, additional heater windings in transformer relationship with the primary of said autotransformer and connecting to each of said lamp contacts to preheat said lamp electrodes upon energization of said ballast, and a starting capacitor connected in parallel with one of said lamps to facilitate series-sequence starting of said lamps, the improvement which comprises:

a power reducing means included in series relationship with the two contacts at one end of said lamps, said power reducing means comprising switch means which initially upon energization has a low impedance state to permit current flow and then switches to a high impedance state, said switch means comprising a first switch member in series with one of said contacts at said one end of said one lamp, a second switch member connected in series with the other of said contacts at said one end of said one lamp, and a current limiting capacitor means of predetermined capacitance connected in parallel circuit arrangement across one of said switch members, whereby when the circuit is initially energized, said switch means permits preheating of said lamp electrode connecting to said contacts at said one end of said one lamp, and thereafter upon response to current flow said switch means switches and causes the lamp current to pass through said current limiting capacitor means and decrease by a predetermined amount the current through said normally operating lamps.

2. The lamps of claim 1, wherein said switch means comprises switch members having a positive temperature coefficient of electrical resistance.

3. An adaptor-container device for connection to one fluorescent lamp of a two fluorescent lamp rapid-start series-sequence installation, wherein said one fluorescent lamp has electrodes operatively positioned proximate the ends thereof, each of said electrodes connected at its ends to two pin contacts positioned at each end of said one lamp, said adaptor-container comprising an outer protective jacket having end members disposed at either end thereof, one of said end members having two receptacle contacts operatively positioned so as to receive said two lamp pin contacts, the other of said end members having two pin members operatively positioned and readily adaptable to fit into a standard rapid-start fluorescent lamp fixture, a power reducing means included within said adaptor-container comprising switch means which initially upon energization has a low impedance state to permit current flow and then switches to a high impedance state, said switch means comprising a first switch member connected in circuit between one of said receptacle contacts and one of said pin members, a second switch member in circuit between the other of said receptacle contacts and the other of said pin members, a current limiting capacitor means of predetermined capacitance connected in parallel circuit arrangement across one of said switch members, said switch means in said low impedance state permitting preheating of said lamp electrode connecting to said two pin contacts disposed at one end of said one fluorescent lamp, and thereafter upon response to current flow said switch means switching to said high impedance state to cause the lamp current to pass through said current limiting capacitor means and decrease by a predetermined amount the current through said normally operating lamp.

4. The adaptor-container of claim 3, wherein said switch means comprises switch members having a positive temperature coefficient of electrical resistance.

5. In combination with a fluorescent lamp of the rapid-start type comprising an elongated envelope having base members integrally connected at opposite ends of said lamp and enclosing a gas-discharge sustaining filling, and a phosphor coating carried on the interior surface of said envelope, said base members each having two electrical contacts attached thereto and in circuit with electrodes operatively positioned proximate the ends of said lamp, the improvement which comprises:

a power reducing means included within one of said base members, said power reducing means comprising switch means which initially upon energization have a low impedance state to permit current flow and then switches to a high impedance state, said switch means comprising a first switch member in series with one of said contacts in said one base member and one end of one of said electrodes, a second switch member in circuit with the other of said contacts in the other end of said one electrode, a current limiting capacitor means connected in parallel circuit arrangement across one of said switch members, whereby when the lamp is initially energized the switch means permit preheating of the said one electrode, and thereafter upon response to current flow said switch means switches to said high impedance state to cause the lamp current to pass through said current limiting capacitor and decrease by a predetermined amount the current through said normally operating lamp.

6. The lamp of claim 5, wherein said switch means comprises switch members having a positive temperature coefficient of electrical resistance.

*7. An adapter-container device for connection to one fluorescent lamp of a standard two fluorescent lamp rapid-start series-sequence fixture, wherein said one fluorescent lamp has electrodes operatively positioned therein proximate the ends thereof, each of said electrodes connected at its ends to two pin contacts positioned at each end of said one lamp, said adapter-container comprising an outer protective jacket having end members disposed at either end thereof, one of said end members having two receptacle contacts operatively positioned so as to receive said two pin contacts at one end of said one lamp, the other of said end members having two pin members operatively positioned and readily adaptable to fit into said standard rapid-start fluorescent lamp fixture, a power reducing means included within said adapter-container device and comprising electrode preheat means operable upon application of energizing potential to said fixture to pass electrode heating current to the pin members of said one lamp which are received by said one end member of said adapter-container device in order to preheat the said lamp electrode which connects to said adapter-container-received pin members, an impedance means of predetermined value enclosed within said adapter-container device, and upon energization of said lamp, said impedance means being included in series circuit with said one lamp to decrease by a predetermined amount the operating current through said one lamp.*

*8. The device as specified in claim 7, wherein said one lamp is shortened an amount sufficient that said one lamp and said adapter-container device as connected thereto will be accommodated by the standard fluorescent fixture.*

*9. In combination with a fluorescent lamp of the rapid-start type comprising an elongated envelope having base members integrally connected at opposite ends of said lamp and enclosing a gas-discharge sustaining filling, and a phosphor coating carried on the interior surface of said envelope, said base members each having two electrical contacts attached thereto and in circuit with electrodes operatively positioned proximate the ends of said lamp, the improvement which comprises:*

*a power reducing means included within one of said base members at one end of said lamp, said power reducing means comprising electrode preheat means operable upon application of energizing potential to said lamp to pass electrode heating current to said two attached electrical contacts in circuit with one of said electrodes at said one end of said lamp in order to preheat the said one electrode, an impedance means of predetermined value included within said one base member, and upon energization of said lamp, said impedance means being included in series circuit with said lamp to decrease by a predetermined amount the operating current through said lamp.*

* * * * *